US012515453B2

(12) United States Patent
Fukada

(10) Patent No.: US 12,515,453 B2
(45) Date of Patent: Jan. 6, 2026

(54) ELEMENT SUBSTRATE AND PRINTING APPARATUS

(71) Applicant: CANON KABUSHIKI KAISHA, Tokyo (JP)

(72) Inventor: Kenji Fukada, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 200 days.

(21) Appl. No.: 18/392,054

(22) Filed: Dec. 21, 2023

(65) Prior Publication Data

US 2024/0208208 A1 Jun. 27, 2024

(30) Foreign Application Priority Data

Dec. 23, 2022 (JP) ................................. 2022-207239

(51) Int. Cl.
*B41J 2/045* (2006.01)
*B41J 2/14* (2006.01)

(52) U.S. Cl.
CPC ....... *B41J 2/04563* (2013.01); *B41J 2/04548* (2013.01); *B41J 2/0455* (2013.01); *B41J 2/0458* (2013.01); *B41J 2/14072* (2013.01); *B41J 2/1408* (2013.01); *B41J 2/14112* (2013.01); *B41J 2/14153* (2013.01); *B41J 2002/14491* (2013.01)

(58) Field of Classification Search
CPC .. B41J 2/04563; B41J 2/04548; B41J 2/0455; B41J 2/0458; B41J 2/04541; B41J 2002/14491; B41J 2/1408; B41J 2/14072; B41J 2/14112; B41J 2/14153; B41J 2/14129; B41J 2/04521; B41J 2/17546
See application file for complete search history.

(56) References Cited

U.S. PATENT DOCUMENTS

| | | | |
|---|---|---|---|
| 9,597,871 | B2 | 3/2017 | Ike |
| 2015/0321470 | A1 | 11/2015 | Ike |

FOREIGN PATENT DOCUMENTS

| | | | | | |
|---|---|---|---|---|---|
| JP | 2009101573 A | * | 5/2009 | ................ | B41J 2/05 |
| JP | 2017113965 | * | 6/2017 | ................ | B41J 2/01 |
| JP | 6388372 B2 | | 9/2018 | | |

* cited by examiner

*Primary Examiner* — Kristal Feggins
(74) *Attorney, Agent, or Firm* — VENABLE LLP

(57) ABSTRACT

An element substrate includes a first heating element configured to generate thermal energy for discharging a liquid by supply of power, a first temperature detecting element configured to detect a temperature of the first heating element, a second temperature detecting element configured to detect the temperature of the first heating element, a first output circuit configured to energize the first temperature detecting element and output a voltage of one terminal of the first temperature detecting element as temperature information; and a second output circuit configured to energize the second temperature detecting element and output a voltage of one terminal of the second temperature detecting element as temperature information. The other terminal of the first temperature detecting element and the other terminal of the second temperature detecting element are connected to a common wire maintained at a predetermined potential.

10 Claims, 10 Drawing Sheets

ELEMENT SUBSTRATE AND PRINTING APPARATUS

BACKGROUND OF THE INVENTION

Field of the Invention

The present invention relates to an element substrate and a printing apparatus.

Description of the Related Art

As a discharge mechanism for a liquid such as ink, a mechanism using a heating element is known. The heating element is arranged on an element substrate to form a nozzle that discharges a liquid. By thermal energy generated when a current is supplied to the heating element, a droplet of ink or the like is discharged from the nozzle to a print medium. By applying such a discharge mechanism to a printing apparatus, an image can be formed on a print medium. Japanese Patent No. 6388372 discloses a technique of determining the state (normal or failure) of a nozzle by monitoring the temperature of a heating element. When monitoring the temperature, two temperature detecting elements are used in correspondence with one heating element, and the state of a nozzle is determined based the detection results of these.

The temperature detecting element is sometimes affected by noise from a circuit or a wire existing around it.

SUMMARY OF THE INVENTION

The present invention provides a technique capable of reducing the influence of noise to a temperature detecting element.

According to an aspect of the present invention, there is provided an element substrate comprising: a first heating element configured to generate thermal energy for discharging a liquid by supply of power; a first temperature detecting element configured to detect a temperature of the first heating element; a second temperature detecting element configured to detect the temperature of the first heating element; a first output circuit configured to energize the first temperature detecting element and output a voltage of one terminal of the first temperature detecting element as temperature information; and a second output circuit configured to energize the second temperature detecting element and output a voltage of one terminal of the second temperature detecting element as temperature information, wherein the other terminal of the first temperature detecting element and the other terminal of the second temperature detecting element are connected to a common wire maintained at a predetermined potential.

Further features of the present invention will become apparent from the following description of exemplary embodiments (with reference to the attached drawings).

DESCRIPTION OF THE EMBODIMENTS

Figure 1:
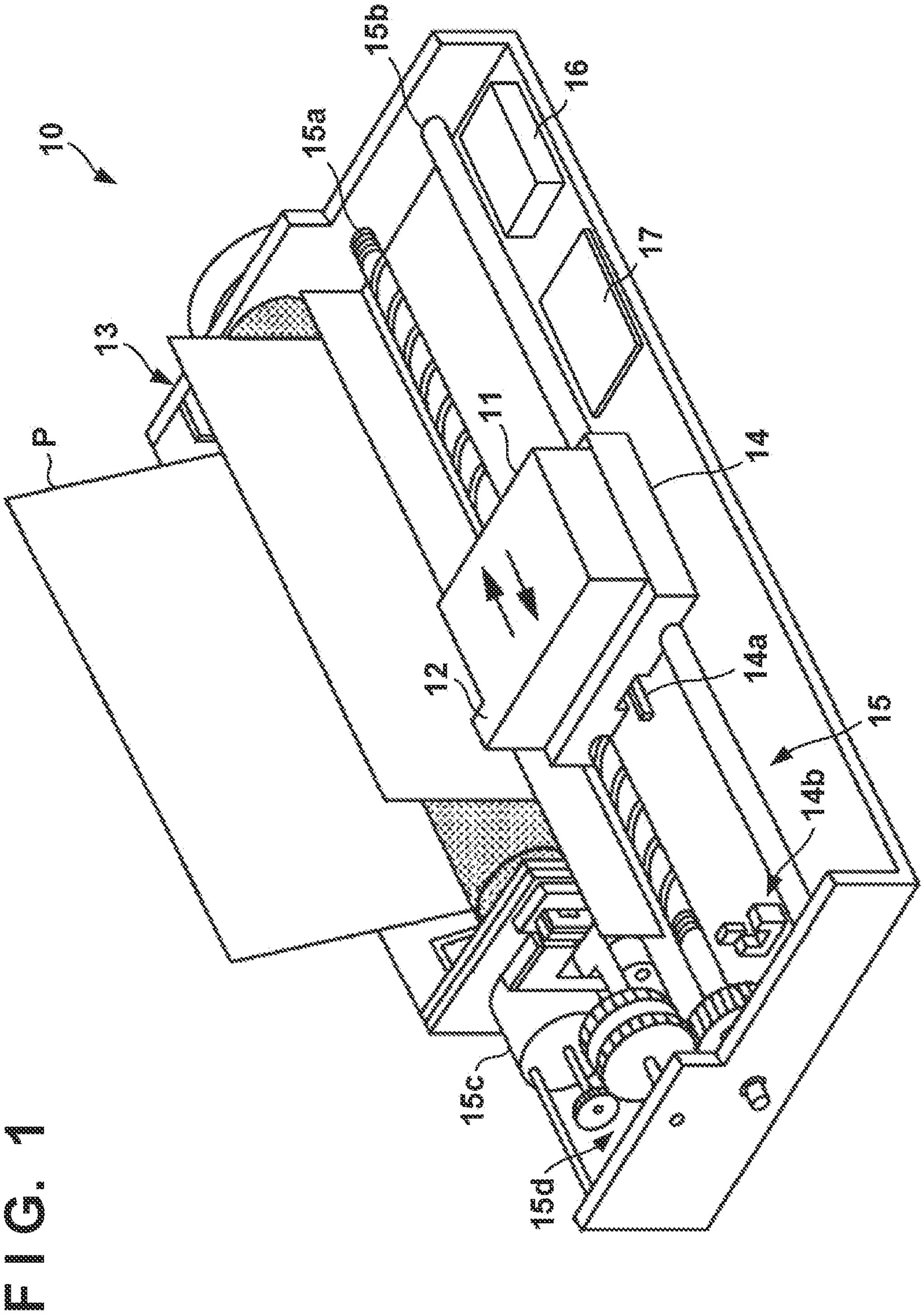
FIG. 1 is a view showing the outer appearance of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a view showing the outer appearance of a printing apparatus 10 according to an embodiment of the present invention. The printing apparatus 10 is an inkjet printing apparatus that performs printing on a print medium by discharging ink. Note that "print" is not limited to formation of significant information such as a character or figure and includes, in a broad sense, formation of an image, design, pattern, or the like on a print medium or processing of a medium, regardless of whether information is significant or insignificant, or whether information is so visualized as to allow the user to visually perceive it. Also, in this embodiment, "print medium" is assumed to be sheet-shaped paper, but it may be fabric, plastic film, or the like.

Also, the printing apparatus to which the present invention can be applied is not limited to an inkjet printing apparatus, and the present invention is also applicable to, for example, a thermal transfer printing apparatus such as a melting type or sublimation type. The printing apparatus may be a manufacturing apparatus for manufacturing, for example, a color filter, an electronic device, an optical device, a fine structure, or the like by a predetermined printing method. The printing apparatus may be an apparatus for forming a three-dimensional image from 3D data.

The printing apparatus 10 includes an ink tank 11 and a printhead 12, which are formed as one unit, and these are mounted on a carriage 14. The printhead 12 discharges a liquid (ink) stored in the ink tank 11 to a print medium P, thereby performing printing. The carriage 14 can be moved by a driving unit 15 reciprocally in the directions of arrows. The driving unit 15 includes a lead screw 15*a* and a guide shaft 15*b*, which are extended in the moving direction of the carriage 14. The lead screw 15*a* engages with the screw hole (not shown) of the carriage 14, and the carriage 14 moves along with the rotation of the lead screw 15*a*. A motor 15*c* and a gear train 15*d* form the rotation mechanism of the lead screw 15*a*. The guide shaft 15*b* guides the movement of the carriage 14. An optical sensor 14*b* that detects a target detection piece 14*a* of the carriage 14 is arranged at one end of the moving range of the carriage 14, and the detection result is used to control the movement of the carriage 14.

A conveyance unit 13 conveys the print medium P. The conveyance unit 13 includes a motor (not shown) that is a driving source, and a conveyance roller (not shown) that is rotated by the driving force of the motor, and the print medium P is conveyed by rotation of the conveyance roller.

The printing apparatus 10 includes an internal power supply 16 that supplies power to be consumed by the printing apparatus 10, and a control circuit 17 that controls the printing apparatus 10. The control circuit 17 causes the apparatus to alternately perform the movement of the printhead 12 by the movement of the carriage 14, ink discharge, and the conveyance of the print medium P, thereby printing an image on the print medium P.

Figure 2:
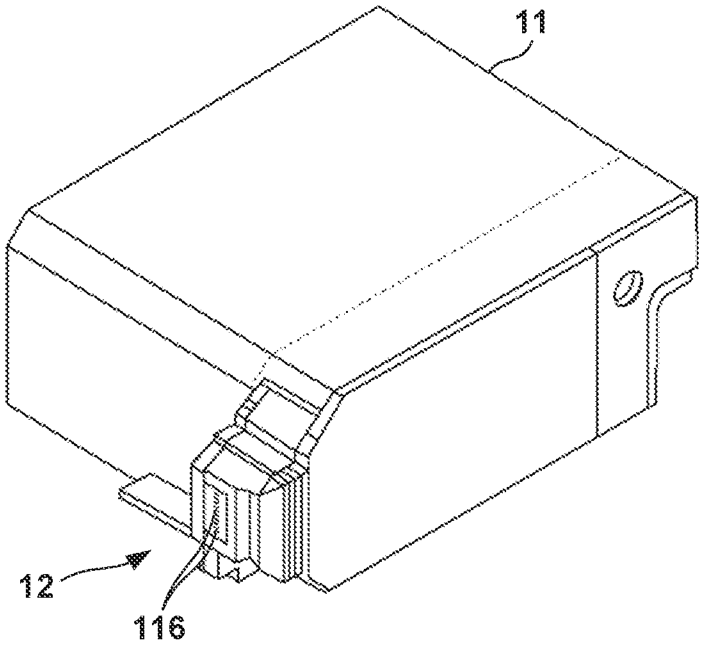
FIG. 2 is a perspective view of the periphery of a printhead.

FIG. 2 is a perspective view of the ink tank 11 and the printhead 12, which are formed as one unit. The ink tank 11 and the printhead 12 can be separated at the position of a broken line. The printhead 12 includes a plurality of orifices 116 that form nozzles for discharging ink. The printhead 12 includes a stacked body of an element substrate and a nozzle member.

<Element Substrate and Nozzle Member>

Figure 3:
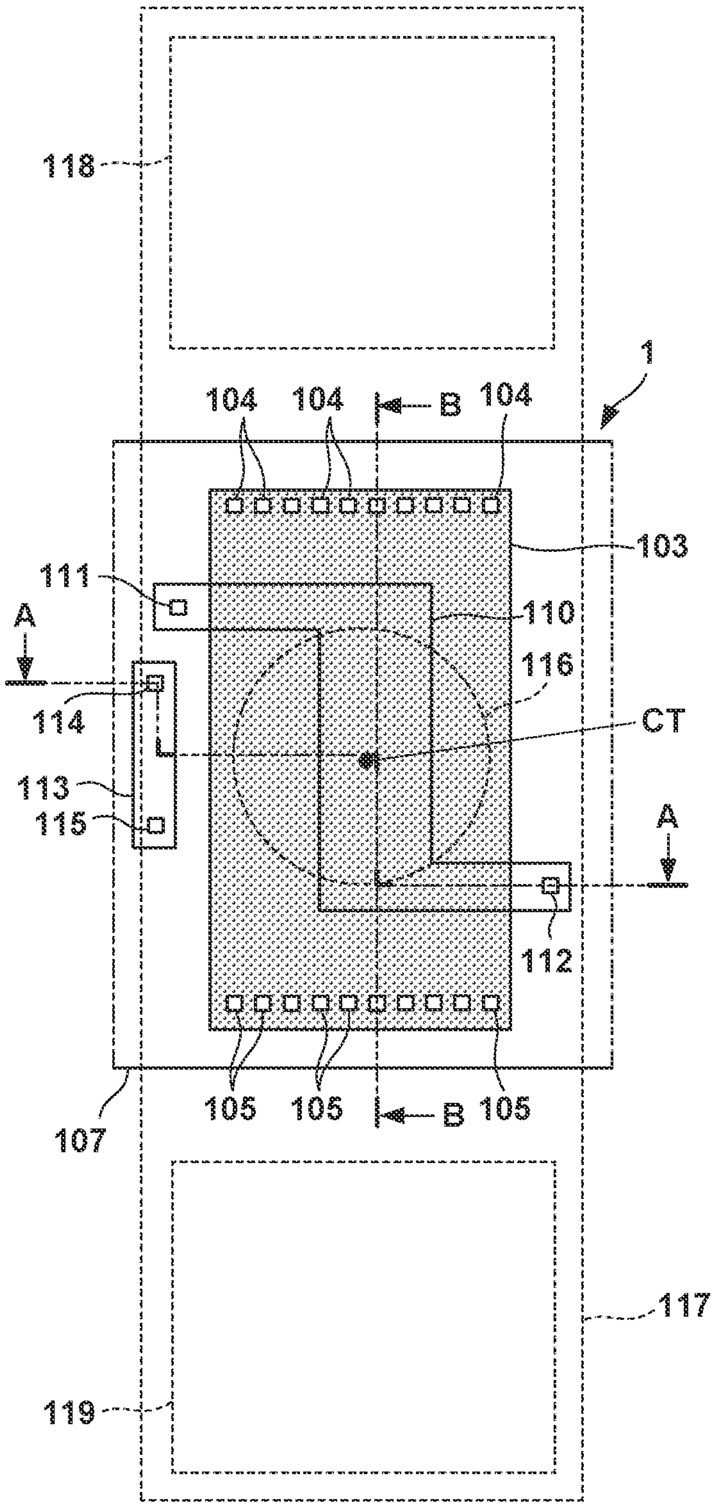
FIG. 3 is a plan view showing the arrangement of main components of an element substrate according to the embodiment of the present invention.
Figure 4A:
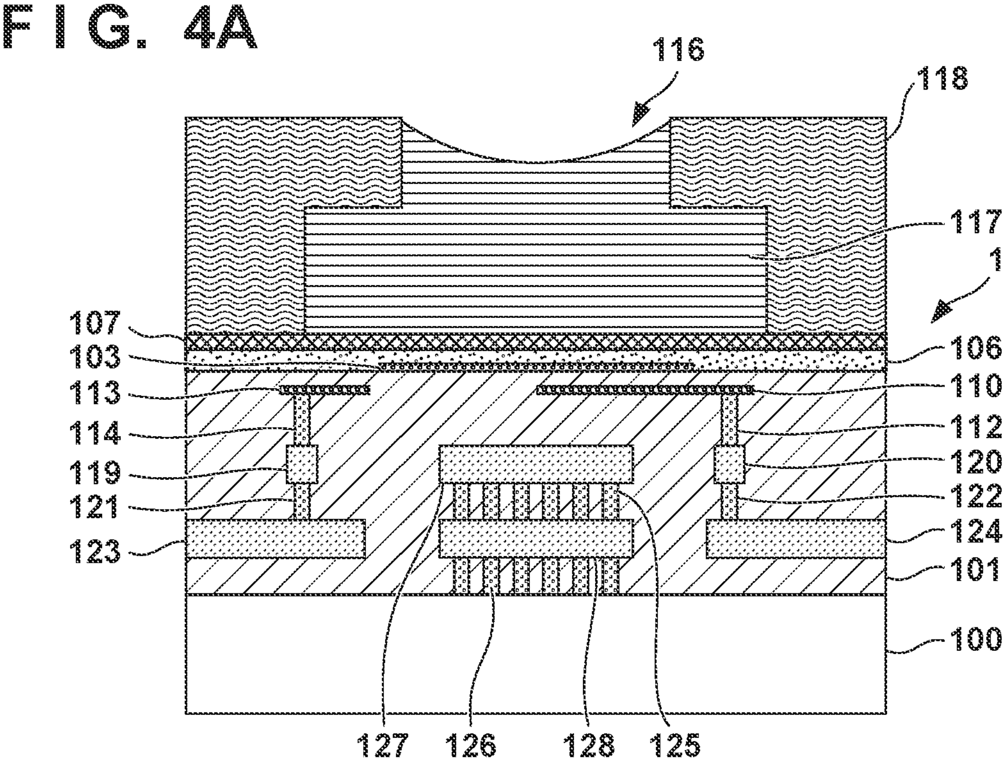
FIG. 4A is a sectional view taken along a line A-A in FIG. 3.
Figure 4B:
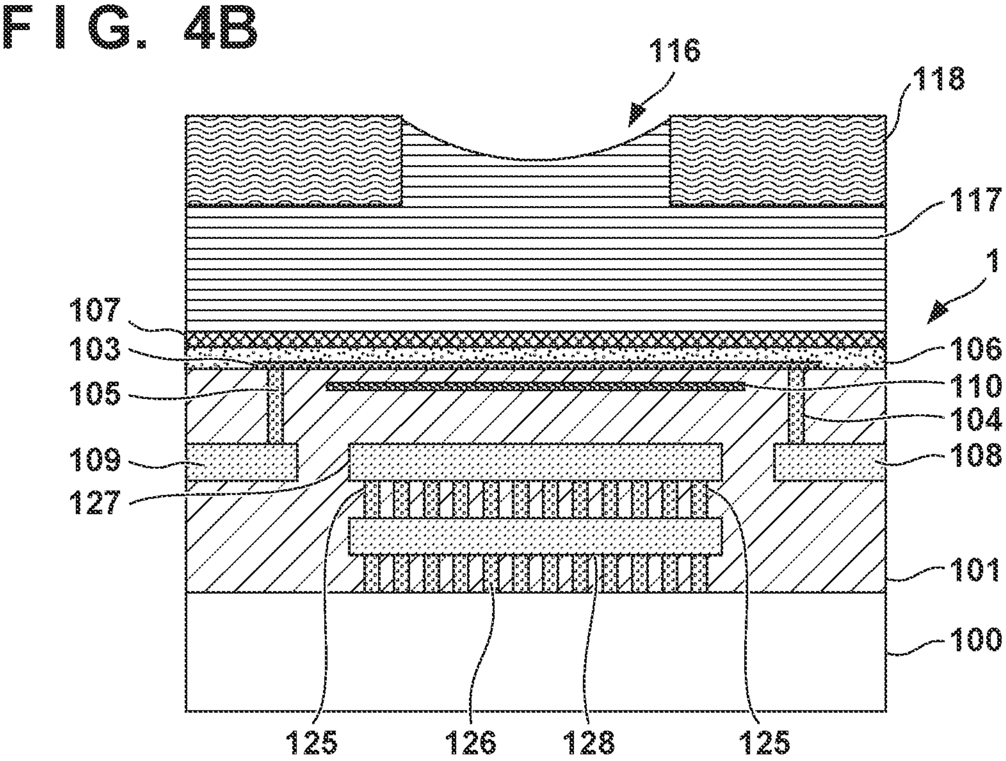
FIG. 4B is a sectional view taken along a line B-B in FIG. 3.

FIG. 3 is a plan view showing the main components of an element substrate 1 that forms the printhead 12 (viewed in the normal direction of the substrate), and shows a structure associated with one orifice 116. FIGS. 4A and 4B are a sectional view taken along a line A-A in FIG. 3 and a sectional view taken along a line B-B, respectively, and also show a nozzle member 118 stacked on the element substrate 1.

The element substrate 1 includes a substrate 100 made of, for example, single-crystal silicon, and an insulating layer 101 is formed on the substrate 100. The insulating layer 101 is made of, for example, an inorganic material such as silicon oxide, has an electric insulating characteristic, and electrically isolates wires formed in the insulating layer 101. Note that transistors and multilayered wires (none are shown) are arranged on the substrate 100.

A heating element (heating resistance element) 103 is arranged on the insulating layer 101, and a protection film 106 is stacked on the insulating layer 101 and the heating element 103. Furthermore, an anti-cavitation layer 107 is stacked on the protection film 106. The anti-cavitation layer 107 has a resistance to cavitation, which reduces the impact of a pressure wave generated when bubbles disappear after discharge of the liquid from the orifice 116, and has a resistance to electrochemical corrosion by the liquid.

The heating element 103 is an electrothermal transducer that generates thermal energy for discharging the liquid (ink) from the orifice 116 by supply of power. The heating element 103 is made of, for example, a resistance material such as tantalum silicon nitride or tungsten silicon nitride. The protection film 106 is made of, for example, an inorganic material such as silicon nitride. The anti-cavitation layer 107 is made of a metal material such as tantalum or iridium.

Figure 5:
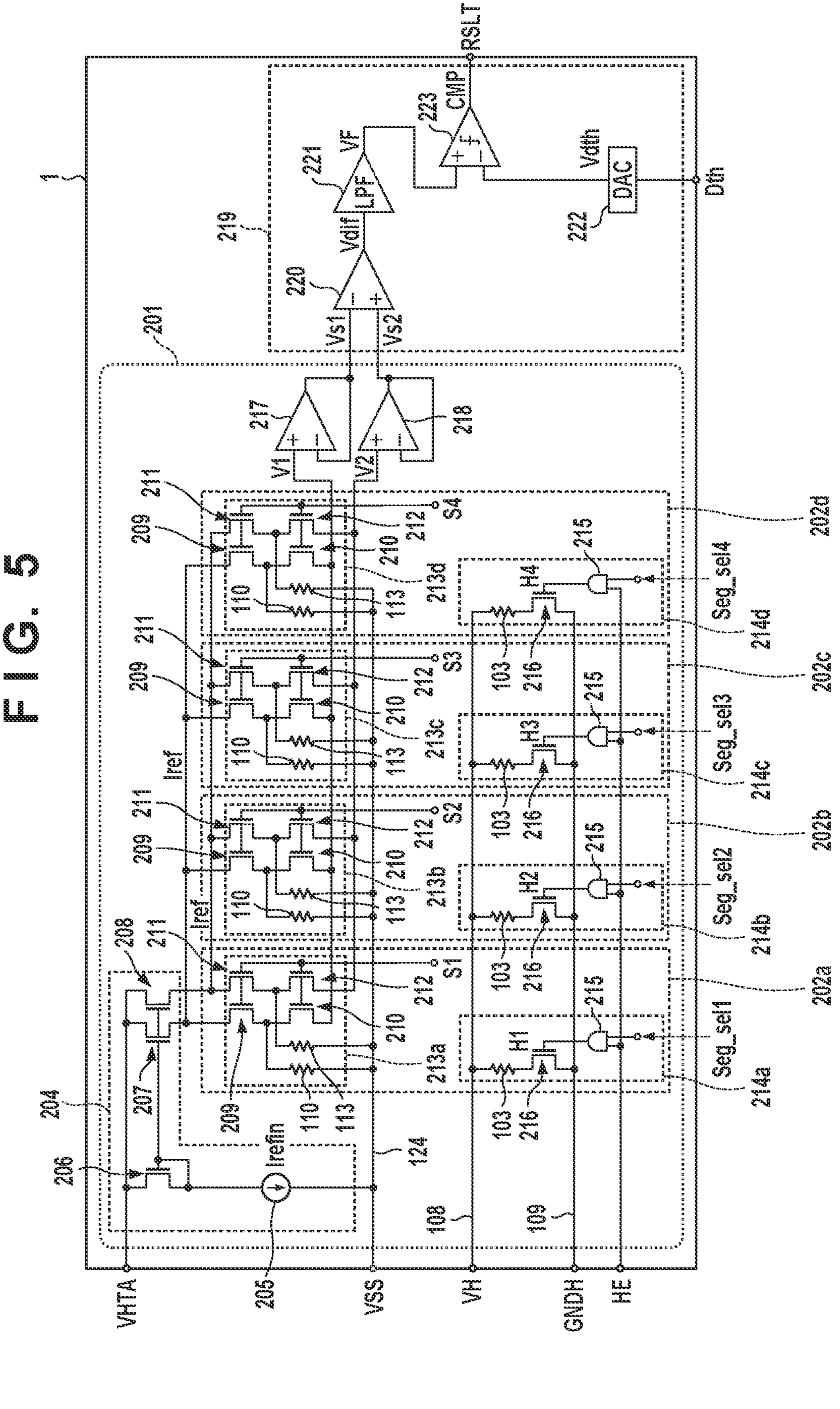
FIG. 5 is a circuit diagram of the element substrate.

The heating element 103 according to this embodiment is a thin film shaped resistor formed into a strip and has a rectangular shape in a planar view. The heating element 103 is connected, at one end in the longitudinal direction, to a signal wire 108 in the lower layer via a conductive plug 104, and connected, at the other end in the longitudinal direction, to a signal wire 109 in the lower layer via a conductive plug 105. Note that as shown in FIG. 5 to be described later, the signal wire 108 is a power supply line connected to a power supply (VH), and the signal wire 109 is a ground line grounded (GNDH) via a switch element 216 (see FIG. 5) to be described later.

In the insulating layer 101, a temperature detecting element 110 and a temperature detecting element 113 are arranged on the lower side of the heating element 103. In other words, an insulating material is interposed between the heating element 103 and the temperature detecting elements 110 and 113. In this embodiment, both the temperature detecting elements 110 and 113 are thin film shaped resistors whose resistance values depend on the temperature. The temperature detecting element 110 and the temperature detecting element 113 may be made of a material having a large temperature coefficient of resistance. For example, the temperature detecting element 110 and the temperature detecting element 113 are each formed as a single layer or a multilayer made of a metal material such as iridium, tantalum, titanium, tungsten, silicon, tantalum silicon nitride, or tungsten silicon nitride or an alloy thereof.

In this embodiment, the temperature detecting element 110 and the temperature detecting element 113 are designed to have the same room temperature resistance value. To increase the output voltage of the temperature detecting elements 110 and 113, the temperature detecting elements 110 and 113 may be made of a material having a high temperature resistance coefficient and may have the same specific resistance as the heating element 103.

In this embodiment, the forms of the temperature detecting elements 110 and 113 are designed such that the temperature detecting element 110 and the temperature detecting element 113 have different temperature sensitivities with respect to the heating element 103. The temperature sensitivity is ease of transmitting the temperature from the heating element 103 to the temperature detecting elements 110 and 113. This generates a difference between the magnitudes of signals output from the temperature detecting elements 110 and 113 with respect to the same heat source (heating element 103). By calculating the difference between the magnitudes of the signals, the state of a nozzle can be more accurately discriminated.

As the detailed forms of the temperature detecting elements 110 and 113, these have different arrangements and shapes. The temperature detecting elements 110 and 113 are arranged to be asymmetric with respect to the heating element 103 in a planar view. In this embodiment, the shortest distance to a center portion CT of the heating element 103 is different between the temperature detecting element 110 and the temperature detecting element 113. The temperature detecting element 110 crosses the heating element 103 in the widthwise direction, and the temperature detecting element 113 does not cross the heating element 103 in the widthwise direction. The temperature detecting element 110 overlaps the center portion CT in the planar view, and the shortest distance is 0. The temperature detecting element 113 is arranged at a position where it does not overlap the heating element 103 in the planar view, and the shortest distance to the center portion CT is longer than that of the temperature detecting element 110. The temperature detecting element 113 is arranged at a position farther from the heating element 103 than the temperature detecting element 110. With this form, the temperature detecting element 110 and the temperature detecting element 113 can obtain different temperature sensitivities.

The temperature detecting element 110 is connected to predetermined wires via conductive plugs 111 and 112, and the temperature detecting element 113 is connected to predetermined wires via conductive plugs 114 and 115. More specifically, the temperature detecting element 110 is connected to a pad 120 on the lower side via the conductive plug 112, and connected to a signal wire 124 below the pad 120 via the conductive plug 122. The temperature detecting element 113 is connected to a pad 119 on the lower side via the conductive plug 114, and connected to a signal wire 123 below the pad 119 via the conductive plug 121.

On the lower side of the heating element 103, a heat dissipation wire 127 is arranged. The heat dissipation wire 127 is connected to a heat dissipation wire 128 on the lower side via a plug 125. The heat dissipation wire 128 is connected to the substrate 100 via a plug 126. With this configuration, heat generated by the heating element 103 is dissipated to the substrate 100 via the plugs.

The conductive plugs 104, 105, 112, 114, 121, 122, 125, and 126 are made of, for example, a metal material containing tungsten or copper as a main component. The signal wires 108, 109, 123, and 124 and the heat dissipation wire 127 and 128 are made of, for example, a metal material containing aluminum or copper as a main component.

The nozzle member 118 forms the orifice 116 and a foaming chamber 117. The foaming chamber 117 is a region contributing to discharge of ink, and is a region whose area is larger than the heating element 103 in a planar view. Also, an ink supply port and an ink discharge port are formed for the foaming chamber 117.

<Circuits of Element Substrate>

FIG. 5 shows an embodiment of the configuration of circuits mounted on the element substrate 1. The element substrate 1 includes a nozzle array circuit 201 and a determination circuit 219. In the example shown in FIG. 5, a configuration in which the nozzle array circuit 201 includes four heating elements 103 (an example in which the number of nozzles is four) is exemplified for the sake of simple explanation. Hence, the circuit shown in FIG. 5 includes control circuits 202*a* to 202*d* (to be collectively referred to as a control circuit 202) provided for the four heating elements 103.

The control circuits 202 include driving circuits 214*a* to 214*d* that individually drive the four heating elements 103, and output circuits 213*a* to 213*d* that control the temperature detecting operations of the four sets of temperature detecting elements 110 and 113. The driving circuits 214*a* to 214*d* will collectively be referred to as a driving circuit 214. The output circuits 213*a* to 213*d* will collectively be referred to as an output circuit 213. Each output circuit 213 performs selection of the temperature detecting elements 110 and 113 to perform the detecting operation (energization of the temperature detecting element) and output of temperature information (a voltage generated by the temperature detecting element) that is a detection result. The nozzle array circuit 201 also includes a constant current circuit 204, and buffer circuits (voltage followers) 217 and 218.

The element substrate 1 includes an input portion to which a signal from the outside (the internal power supply 16 or the control circuit 17) is input, and an output portion that outputs a signal to the outside (to be collectively referred to as an input/output portion). The input/output portion is formed by a pad or a terminal. As some of the input/output portions, a voltage to be supplied to the constant current circuit 204 (the driving power of the temperature detecting elements 110 and 113) is input to VHTA. VSS is the reference potential (ground) of the element substrate 1. VH is a voltage used to drive the heating resistance element 103, and GNDH is the reference potential (ground) of the element substrate 1.

The driving circuit 214 that drives the heating element 103 includes a switch element (MOS transistor) 216 and an AND gate circuit 215. Each AND gate 215 includes two input terminals, a signal HE is input to one terminal, and a corresponding one of mask signals Seg_sel1 to Seg_sel4 is input to the other terminal. The output of the AND gate 215 is connected to the gate terminal of the switch element (MOS transistor) 216. One terminal of the heating element 103 is connected to the wire 108 connected to VH, and the other terminal is connected to the wire GNDH via the switch element 216.

The signal HE is a signal that decides the on or off state of the switch element 216. The mask signals Seg_sel1 to Seg_sel4 are signals that mask the signal HE. To drive the heating element 103 of the control circuit 202*a*, the mask signal Seg_sel1 is selected and set to H level. Thus, the mask of the signal HE is canceled, and a signal H1 is output from the AND gate 215 to the gate terminal of the switch element 216. When the signal of H level is input as the signal H1 to the gate terminal of the switch element 216, the voltage VH (for example, 24 V) is applied to one terminal of the heating element 103, and the voltage GNDH is applied to the other terminal. By the supply of the power, thermal energy for discharging the liquid (ink) is generated.

Similarly, to drive the heating element 103 of the control circuit 202*b*, the mask signal Seg_sel2 is selected and set to H level. When the signal of H level is input as a signal H2 to the gate terminal of the switch element 216, the heating element 103 generates thermal energy for discharging the liquid. To drive the heating element 103 of the control circuit 202*c*, the mask signal Seg_sel3 is selected and set to H level. When the signal of H level is input as a signal H3 to the gate terminal of the switch element 216, the heating element 103 generates thermal energy for discharging the liquid. To drive the heating element 103 of the control circuit 202*d*, the mask signal Seg_sel4 is selected and set to H level. When the signal of H level is input as a signal H4 to the gate terminal of the switch element 216, the heating element 103 generates thermal energy for discharging the liquid.

A plurality of signals among the mask signals Seg_sel1 to Seg_sel4 can be selected at the same time. However, when performing nozzle state inspection using the temperature detecting elements 110 and 113, one of the signals is selected. This can reduce the influence of noise from the circuits of other nozzles.

The output circuit 213 includes switch elements (MOS transistors) 209 to 212. The switch element 209 and the switch element 210 are connected in series. The terminal of the switch element 210 is connected to the + side of the buffer circuit 217, and temperature information is input to the buffer circuit 217. One terminal of the temperature detecting element 110 is connected to a wire that connects the switch element 209 and the switch element 210, and the other terminal is connected to the wire 124 connected to VSS. The switch element 211 and the switch element 212 are connected in series. The terminal of the switch element 212 is connected to the + side of the buffer circuit 218, and temperature information is input to the buffer circuit 218. One terminal of the temperature detecting element 113 is connected to a wire that connects the switch element 211 and the switch element 212, and the other terminal is connected to the wire 124 connected to VSS.

The constant current circuit 204 includes current supply circuits 207 and 208 of two systems, a current type D/A converter (DAC) 205, and a mirroring circuit 206. One terminal of the mirroring circuit 206 is connected to VHTA, and the other terminal is connected in series with the DAC 205. The other terminal of the DAC 205 is connected to VSS. One terminal of the current supply circuit 207 is connected to the wire VHTA, and the other terminal is connected to the switch element 209. One terminal of the current supply circuit 208 is connected to VHTA, and the other terminal is connected to the switch element 211. The gates of the mirroring circuit 206 and the current supply circuits 207 and 208 are connected.

The current supply circuits 207 and 208 form a current mirror circuit. In the constant current circuit 204, a current Iref is mirrored to the current supply circuits 207 and 208 at an amplification factor of n times (n=real number) by the mirroring circuit 206 using the current type DAC 205 as a reference current source. As the power supply sources to the constant current circuit 204, the voltage VHTA (for example, 5 V) is applied from the outside to one terminal of the constant current circuit 204, and the voltage VSS is applied to the other terminal. The switch element 209 controls current supply from the current supply circuit 207 to the temperature detecting element 110. The switch element 210 controls the output of a voltage generated in the temperature detecting element 110 to the buffer circuit 217. Similarly, the switch element 211 controls current supply from the current supply circuit 208 to the temperature detecting element 113. The switch element 212 controls the output of a voltage generated in the temperature detecting element 113 to the buffer circuit 218.

Selection signals S1 to S4 are input to the gate terminals of the switch elements 209 to 212. The selection signals S1 to S4 are signals for selecting the set of the temperature detecting elements 110 and 113 as the target to perform the temperature detecting operation.

The signal S1 is a signal for selecting the set of the temperature detecting elements 110 and 113 of the output circuit 213*a*. When the signal S1 is set to H level, the switch elements 209 to 212 of the output circuit 213*a* are simultaneously turned on, and the temperature detecting element 110 and the temperature detecting element 113 of the output circuit 213*a* are selected. Currents from the current supply circuits 207 and 208 are applied to the temperature detecting element 110 and the temperature detecting element 113, respectively, and pieces of temperature information V1 and V2 are output from the switch elements 210 and 212 to the buffer circuits 217 and 218.

Similarly, the signal S2 is a signal for selecting the set of the temperature detecting elements 110 and 113 of the output circuit 213*b*. When the signal S2 is set to H level, the switch elements 209 to 212 of the output circuit 213*b* are simultaneously turned on. Currents from the current supply circuits 207 and 208 are applied to the temperature detecting element 110 and the temperature detecting element 113 of the output circuit 213*b*, respectively, and the pieces of temperature information V1 and V2 are output from the switch elements 210 and 212 to the buffer circuits 217 and 218. The signal S3 is a signal for selecting the set of the temperature detecting elements 110 and 113 of the output circuit 213*c*. When the signal S3 is set to H level, the switch elements 209 to 212 of the output circuit 213*c* are simultaneously turned on. Currents from the current supply circuits 207 and 208 are applied to the temperature detecting element 110 and the temperature detecting element 113 of the output circuit 213*c*, respectively, and the pieces of temperature information V1 and V2 are output from the switch elements 210 and 212 to the buffer circuits 217 and 218. The signal S4 is a signal for selecting the set of the temperature detecting elements 110 and 113 of the output circuit 213*d*. When the signal S4 is set to H level, the switch elements 209 to 212 of the output circuit 213*d* are simultaneously turned on. Currents from the current supply circuits 207 and 208 are applied to the temperature detecting element 110 and the temperature detecting element 113 of the output circuit 213*d*, respectively, and the pieces of temperature information V1 and V2 are output from the switch elements 210 and 212 to the buffer circuits 217 and 218.

Note that when performing nozzle state inspection, the signals S1 to S4 are sequentially set to H level such that a plurality of signals do not simultaneously change to H level.

In the temperature detecting elements 110 and 113, letting T0 be a room temperature, Rs0 be a resistance at that time, and TCR be a temperature resistance coefficient of the temperature detecting element 110, a resistance Rs1 of the temperature detecting element 110 at a temperature T1 is given by $$Rs1 = Rs0 \cdot \{1 + TCR \cdot (T1 - T0)\} \tag{1}$$

The voltage (temperature information) V1 generated at the constant current supply side terminal of the temperature detecting element 110 is given by $$V1 - Iref \cdot Rs1 = Iref \cdot Rs0 \cdot \{1 + TCR \cdot (T1 - T0)\} \tag{2}$$

The temperature information V1 represented by equation (2) above is output to the buffer circuit 217.

A resistance Rs2 of the temperature detecting element 113 at a temperature T2 is given by $$Rs2 = Rs0 \cdot \{1 + TCR \cdot (T2 - T0)\} \tag{3}$$

The voltage (temperature information) V2 generated at the constant current supply side terminal of the temperature detecting element 113 is given by $$V2 - Iref \cdot Rs2 = Iref \cdot Rs0 \cdot \{1 + TCR \cdot (T2 - T0)\} \tag{4}$$

The temperature information V2 represented by equation (4) above is output to the buffer circuit 218.

Note that in this embodiment, the temperature detecting element 110 and the temperature detecting element 113 are configured to have the same room temperature resistance value Rs0. However, the room temperature resistance values may be different. In this case, the constant current values supplied to the temperature detecting element 110 and the temperature detecting element 113 are adjusted by the current supply circuits 207 and 208 such that the pieces of temperature information V1 and V2 at the room temperature T0 equal.

Next, in this embodiment, the pieces of temperature information V1 and V2 are input to the determination circuit 219 via the buffer circuits 217 and 218. If the pieces of temperature information are input to a differential amplifier 220 in the determination circuit 219 without interposing the buffer circuits 217 and 218, the resistances of the switch elements may affect the input impedance of the differential amplifier 220. As a result, the pieces of temperature information V1 and V2 are input to the differential amplifier 220 after voltage drop. For this reason, in this embodiment, the pieces of temperature information V1 and V2 are input pieces of temperature information Vs1 and Vs2 to the differential amplifier 220 via the buffer circuits 217 and 218.

The determination circuit 219 includes the differential amplifier 220, a low-pass filter 221, a voltage output type D/A converter (DAC) 222, and a comparator 223. The differential amplifier 220 includes two input terminals, the output terminal of the buffer circuit 217 is connected to one terminal, and the output terminal of the buffer circuit 218 is connected to the other terminal.

The output terminal of the differential amplifier 220 is connected to the input terminal of the low-pass filter 221. A threshold signal Dth from the outside is input to the input terminal of the voltage output type DAC 222. The comparator 223 includes two input terminals, one terminal is connected to the output terminal of the low-pass filter 221, and the other terminal is connected to the output terminal of the voltage output type DAC 222. The output of the comparator 223 is output to the outside (for example, the control circuit 17) via RSLT.

Figure 6A:
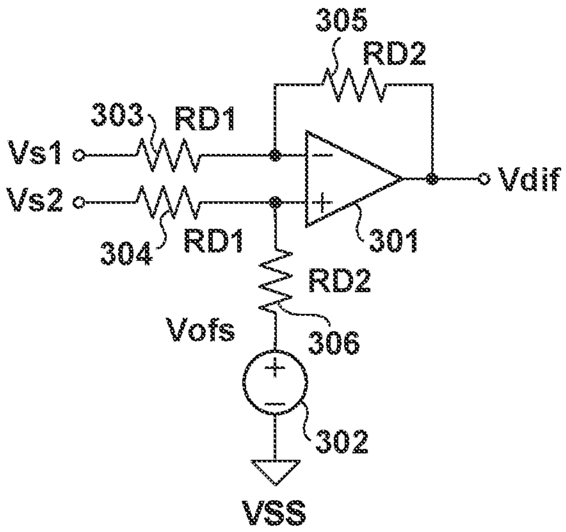
FIGS. 6A to 6C are explanatory views of some circuits of the element substrate.

FIG. 6A is a circuit diagram showing the detailed circuit configuration of the differential amplifier 220. The differential amplifier 220 includes an operational amplifier 301, a constant voltage source 302, and resistors 303 to 306. The operational amplifier 301 includes two input terminals, one terminal of each of the resistor 303 and the resistor 305 is connected to one input terminal, and one terminal of each of the resistor 304 and the resistor 306 is connected to the other input terminal. The other terminal of the resistor 305 is connected to the output terminal of the operational amplifier 301. The other terminal of the resistor 306 is connected to VSS via the constant voltage source 302.

The differential amplifier 220 amplifies a signal obtained by subtracting the temperature information Vs1 from the temperature information Vs2 at an amplification factor Gdif. The differential amplifier 220 then outputs a signal Vdif offset by a voltage Vofs of the constant voltage source 302, which is given by $$Vdif = Gdif\cdot(Vs2-Vs1)+Vofs = Vofs - Gdif\cdot Iref\cdot Rs0\cdot TCR\cdot(T2-T1) \quad (5)$$

Here, letting RD1 be resistance values of the resistors 303 and 304, and RD2 be resistance values of the resistors 305 and 306, the amplification factor Gdif is given by $$Gdif = RD2/RD1 \quad (6)$$

FIG. 5 will be referred to. Vs1 and Vs2 are individually affected by noise. When Vs1 is subtracted from Vs2, the noise can be reduced. This is an advantage of associating the two temperature detecting elements 110 and 113 with the one heating element 103. Also, noise remaining in the signal Vdif is suppressed by the low-pass filter 221 and output as a signal VF.

The voltage output type DAC 222 converts the input threshold signal Dth into a threshold voltage Vdth and outputs the threshold voltage. For example, Vdth can be set to 256 ranks from 0.5 V to 2.54 V in increments of 8 mV. In the comparator 223, the signal VF is compared with the threshold voltage Vdth based on the threshold signal Dth, thereby determining the state of the nozzle. The comparator 223 outputs a signal CMP that changes to high level (non-discharge state) if VF>Vdth, and to low level (normal discharge state) if VF≤Vdth. The signal CMP is output from RSLT to the outside.

The nozzle state inspection is performed by sequentially selecting one heating element 103 and a corresponding one set of temperature detecting elements 110 and 113. In other words, the nozzle state inspection is performed by sequentially selecting one of the control circuits 202*a* to 202*d*. For example, if the control circuit 202*a* is selected, the mask signal Seg_sel1 and the selection signal S1 are set to H level, and the heating element 103 and the temperature detecting elements 110 and 113 in the control circuit 202*a* are selected. The state of the nozzle corresponding to the heating element 103 is then determined.

Figure 7:
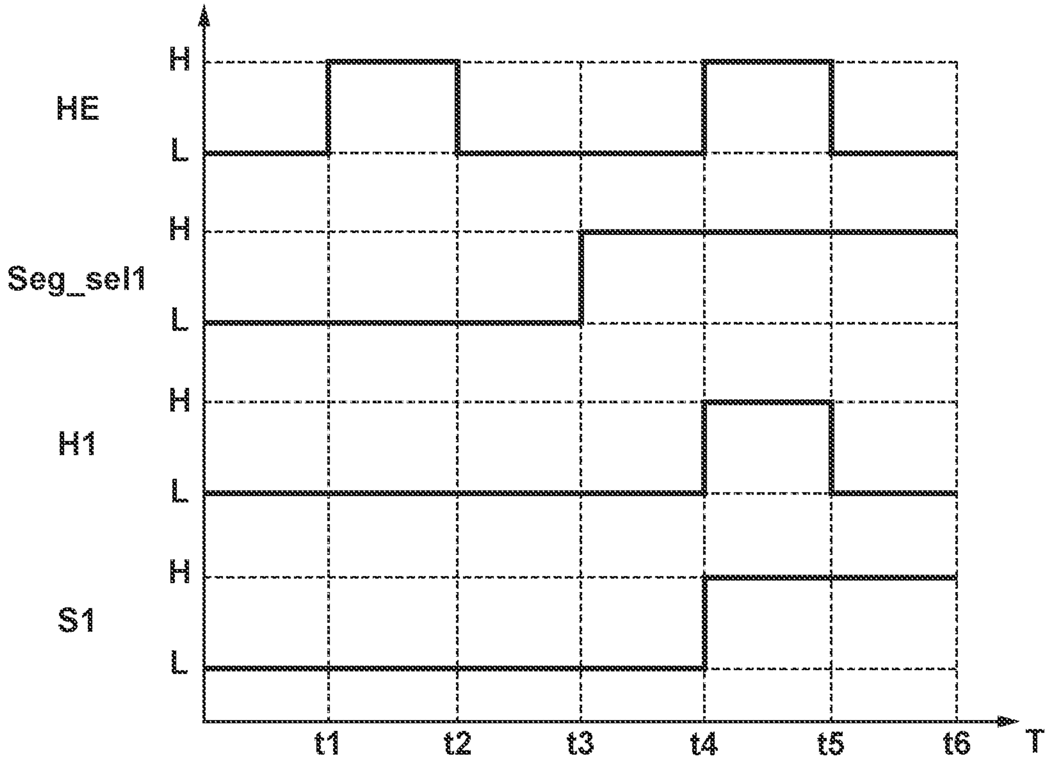
FIG. 7 is a timing chart of signals input to the element substrate.

FIG. 7 is a view showing an example of time-rate changes of the signal HE, the signal Seg_sel1, the signal H1, and the signal S1. The abscissa represents time, and the ordinate represents the logic level (H or L). The signal HE changes from L level to H level at time t1, changes from H level to L level at time t2, changes from L level to H level at time t4, and changes from H level to L level at time t5. The signal Seg_sel1 changes from L level to H level at time t4. The signal H1 is at H level only during the time when both the signal HE and the signal Seg_sel1 are at H level, and is therefore at H level from time t4 to time t5. The signal S1 is at H level from time t4 to time t5. The time when the signal is at H level is the state inspection time. The state inspection is performed between time t4 and time 16.

FIG. 7 shows the relationship between the signal HE, the signal Seg_sel1, the signal H1, and the signal S1. However, the signal HE, the signal Seg_sel2, the signal H2, and the signal S2, the signal HE, the signal Seg_sel3, the signal H3, and the signal S3, or the signal HE, the signal Seg_sel4, the signal H4, and the signal S4 also have the same relationship.

Figure 6B:
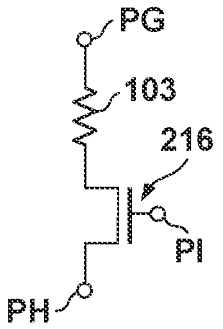
Figure 6C:
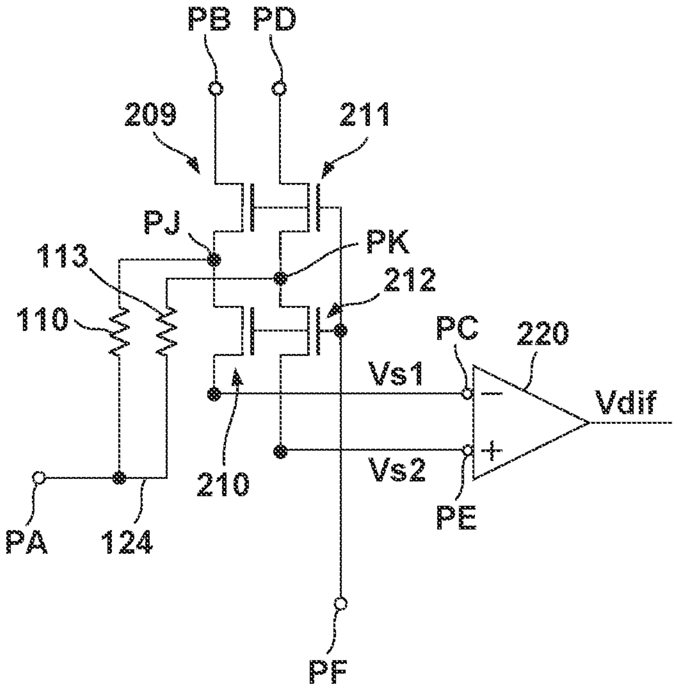

FIG. 6B is a view simply showing the heating element 103 and the driving circuit 214 thereof. FIG. 6C is a view simply showing the temperature detecting elements 110 and 113 and the output circuit 213 thereof. One terminal of each of the temperature detecting elements 110 and 113 is connected to the common potential of a contact PA. The other terminal of the temperature detecting element 110 is connected, at a contact PJ, to the connection wire between the serially connected switch elements 209 and 210. The other terminal of the temperature detecting element 110 is connected to a contact PB via the switch element 209, and also connected to a contact PC via the switch element 210. The other terminal of the temperature detecting element 113 is connected, at a contact PK, to the connection wire between the serially connected switch elements 211 and 212. The other terminal of the temperature detecting element 113 is connected to a contact PD via the switch element 211, and also connected to a contact PE via the switch element 212.

The gate terminals of the switch elements 209 to 212 are connected to a contact PF, and the control signals (S1 to S4) for changing the paths between the drain terminals and the source terminals of the switch elements 209 to 212 to a connection state or a nonconnection state are input to the contact PF.

One terminal of the heating element 103 is connected to a contact PG, and the other terminal is connected to a contact PH via the switch element 216. The gate terminal of the switch element 216 is connected to a contact PI, and the control signals (Seg_sel1 to Seg_sel4) for changing the path between the drain terminal and the source terminal of the switch element 216 to a connection state or a nonconnection state are input to the contact PI.

The current supply circuit 207 is connected to the contact PB, and the current supply circuit 208 is connected to the contact PD (FIG. 5). The switch element 210 is connected to one contact PC of the differential amplifier 220 via the buffer circuit 217, and the switch element 212 is connected to the other contact PE of the differential amplifier 220 via the buffer circuit 218.

In this embodiment, one terminal of each of the temperature detecting elements 110 and 113 is connected to the common wire 124 maintained at a predetermined potential. The potential of one terminal of each of the temperature detecting elements 110 and 113 is stabilized, and an individual variation of the potential with respect to external noise can be suppressed. It is therefore possible to reduce the influence of noise on the temperature detecting elements 110 and 113. In addition, since the voltage extraction wire for each of the temperature detecting elements 110 and 113 is only one wire of the current supply side terminal, and circuit area reduction can be expected. Furthermore, in this embodiment, the wire 124 is connected to VSS, and VSS is the reference potential (ground) of the element substrate 1. The potential of one terminal of each of the temperature detecting elements 110 and 113 can be more reliably stabilized.

Note that in this embodiment, the determination circuit 219 is provided on the element substrate 1. However, the determination circuit 219 may be provided in a control chip provided on the printhead 12 outside the element substrate 1. Alternatively, the determination circuit 219 may be provided in a control chip (for example, the control circuit 17) provided in the printing apparatus 10 outside the printhead 12.

Second Embodiment

Other examples of the arrangement of temperature detecting elements 110 and 113 will be described with reference to FIGS. 8A and 8B.

Figure 8A:
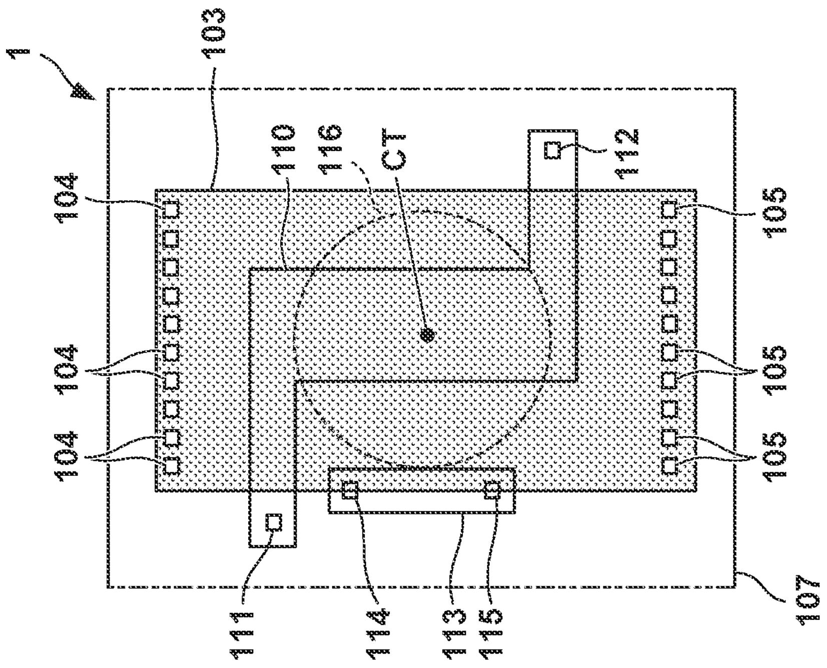
FIGS. 8A and 8B are views showing other examples of the arrangement of temperature detecting elements.

In the example shown in FIG. 8A, a part of the temperature detecting element 113 overlaps a heating element 103 in a planar view of an element substrate 1. As described above, at least a part of the temperature detecting element 113 may overlap the heating element 103. According to this configuration example, the interval between the nozzles can be reduced, and many nozzles can be arranged at a high density in the element substrate 1.

Figure 8B:
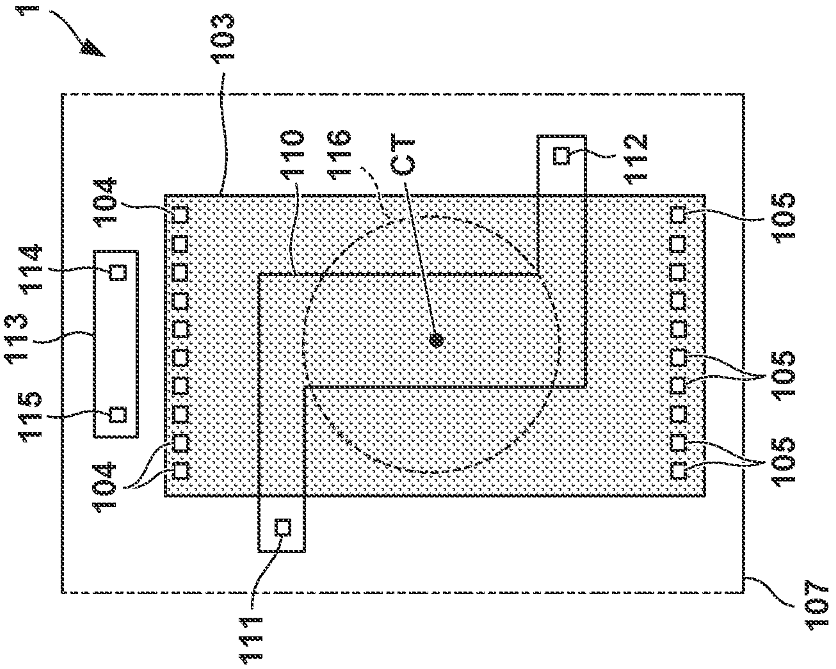

In the example shown in FIG. 8B, the temperature detecting element 113 is arranged on the side of a short side of the heating element 103. In this configuration example as well, the interval between the nozzles can be reduced, and many nozzles can be arranged at a high density in the element substrate 1. Note that even in the example shown in FIG. 8B, the temperature detecting element 113 may be arranged to overlap the heating element 103, like the example shown in FIG. 8A. This makes it possible to arrange a larger number of nozzles at a higher density in the element substrate 1.

Third Embodiment

Figure 9:
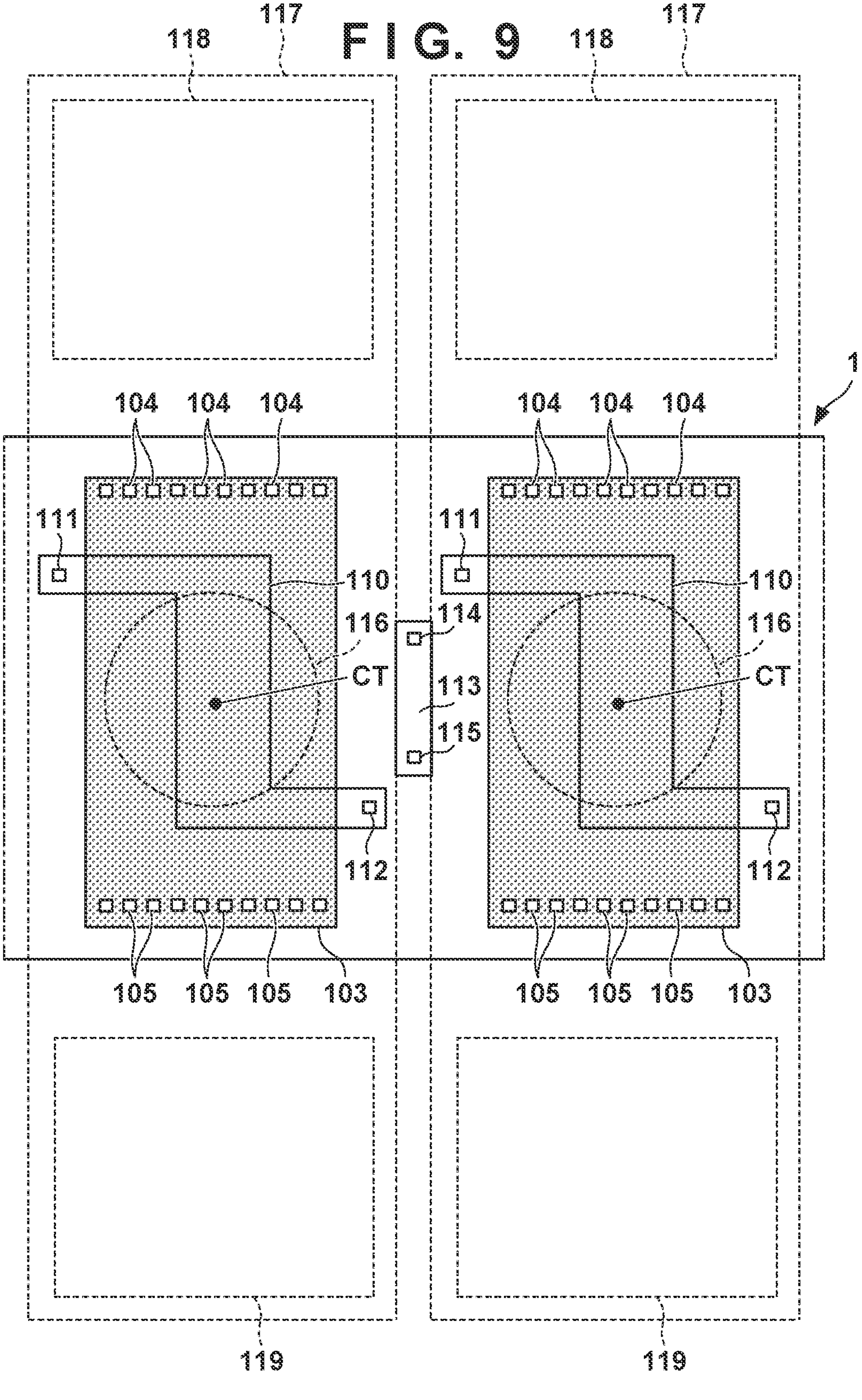
FIG. 9 is a view showing another example of the arrangement of temperature detecting elements.

Two adjacent heating elements 103 may share one of temperature detecting elements 110 and 113 of one set. FIG. 9 is a plan view of an element substrate 1 showing an example. In the example shown in FIG. 9, the temperature detecting elements 110 are individually provided for the two adjacent heating elements 103. On the other hand, between the two adjacent heating elements 103, one temperature detecting element 113 shared by these is arranged. The temperature detecting element 113 is formed to have the same temperature sensitivity for the two heating elements 103. In this embodiment, the temperature detecting element 113 is arranged at a position equidistant from center portions CT of the heating elements 103.

Figure 10:
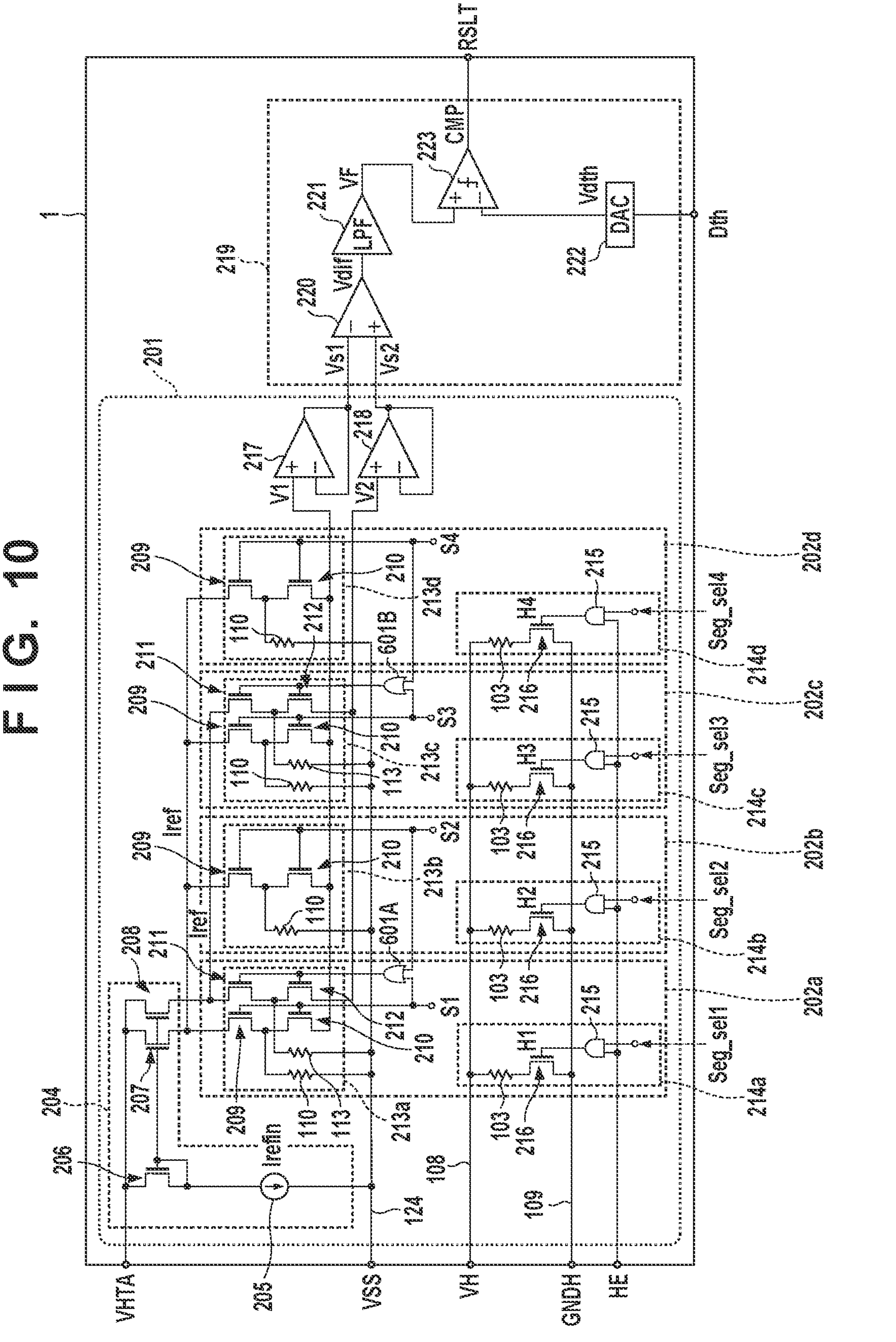
FIG. 10 is a circuit diagram of the element substrate in the example shown in FIG. 9.

FIG. 10 is a circuit diagram of the element substrate 1 according to this embodiment. As an example, like the example shown in FIG. 5, a configuration in which a nozzle array circuit 201 includes four heating elements 103 (an example in which the number of nozzles is four) is exemplified, and a configuration different from the example shown in FIG. 5 will be described.

Output circuits 213*b* and 213*d* according to this embodiment do not include switch elements 211 and 212 corresponding to the temperature detecting elements 113. That is, the heating elements 103 of driving circuits 214*a* and 214*b* share the temperature detecting element 113 of an output circuit 213*a*. In addition, the heating elements 103 of driving circuits 214*c* and 214*d* share the temperature detecting element 113 of an output circuit 213*c*.

Hence, an OR gate 601A to which selection signals S1 and S2 are input is provided, and an OR gate 601B to which selection signals S3 and S4 are input is provided. The output of the OR gate 601A is input to the gate terminals of switch elements 211 and 212. When the selection signal S1 changes to H level, the temperature detecting elements 110 and 113 of the output circuit 213*a* are energized, and pieces of temperature information are output from the switch elements 210 and 212. When the selection signal S2 changes to H level, the temperature detecting element 110 of the output circuit 213*b* and the temperature detecting element 113 of the output circuit 213*a* are energized, and pieces of temperature information are output from the switch element 210 of the output circuit 213*b* and the switch element 212 of the output circuit 213*a*.

Similarly, when the selection signal S3 changes to H level, the temperature detecting elements 110 and 113 of the output circuit 213*c* are energized, and pieces of temperature information are output from the switch elements 210 and 212. When the selection signal S4 changes to H level, the temperature detecting element 110 of the output circuit 213*d* and the temperature detecting element 113 of the output circuit 213*c* are energized, and pieces of temperature information are output from the switch element 210 of the output circuit 213*d* and the switch element 212 of the output circuit 213*c*.

Thus, the two adjacent heating elements 103 share the temperature detecting element 113, thereby decreasing the number of temperature detecting elements. Also, the interval between the nozzles can be reduced, and many nozzles can be arranged at a high density in the element substrate 1.

Furthermore, the number of circuit elements associated with the temperature detecting element 113 can also be decreased, and the circuit area can be reduced.

Other Embodiments

The present invention is not limited to the above-described embodiments. For example, in the example shown in FIG. 5 or 10, a configuration in which the number of nozzles on the element substrate 1 is four has been exemplified for the descriptive convenience. However, the number of nozzles may be, for example, 512. Not one line of nozzle array circuits 201 but a plurality of lines may be provided. As the shape of the temperature detecting element 110, a Z shape has been exemplified. However, the shape is not limited to this. The temperature detecting element 110 may have an arbitrary shape traversing the heating element 103 in the widthwise direction near the center of the heating element 103.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-207239, filed Dec. 23, 2022, which is hereby incorporated by reference herein in its entirety.

What is claimed is:

1. An element substrate comprising:
- a first heating element configured to generate thermal energy for discharging a liquid by supply of power;
- a first temperature detecting element configured to detect a temperature of the first heating element;
- a second temperature detecting element configured to detect the temperature of the first heating element;
- a first output circuit configured to energize the first temperature detecting element and output a voltage of one terminal of the first temperature detecting element as temperature information; and
- a second output circuit configured to energize the second temperature detecting element and output a voltage of one terminal of the second temperature detecting element as temperature information,
- wherein the other terminal of the first temperature detecting element and the other terminal of the second temperature detecting element are connected to a common wire maintained at a predetermined potential.

2. The substrate according to claim 1, wherein
- the predetermined potential is a reference potential of the element substrate.

3. The substrate according to claim 1, further comprising:
- a first current supply circuit configured to supply a current to the first temperature detecting element via the first output circuit;
- a second current supply circuit configured to supply the current to the second temperature detecting element via the second output circuit, and
- a current source configured to supply the current to the first current supply circuit and the second current supply circuit,
- wherein the first current supply circuit and the second current supply circuit form a current mirror circuit.

4. The substrate according to claim 1, wherein
- a shortest distance to a center portion of the first heating element is different between the first temperature detecting element and the second temperature detecting element.

5. The substrate according to claim 1, wherein
- the first heating element is formed into a strip, and
- one of the first temperature detecting element and the second temperature detecting element crosses the first heating element in a widthwise direction, and the other does not cross the first heating element in the widthwise direction.

6. The substrate according to claim 1, further comprising:
- a first buffer circuit to which the temperature information output from the first output circuit is input;
- a second buffer circuit to which the temperature information output from the second output circuit is input; and
- a differential amplifier configured to amplify and output a difference between the pieces of temperature information output from the first buffer circuit and the second buffer circuit.

7. The substrate according to claim 1, further comprising:
- a second heating element configured to generate thermal energy for discharging a liquid by supply of power;
- a third temperature detecting element configured to detect a temperature of the second heating element; and
- a third output circuit configured to energize the third temperature detecting element and output a voltage of one terminal of the third temperature detecting element as temperature information,
- wherein the second temperature detecting element detects the temperature of the second heating element as well, and
- the other terminal of the third temperature detecting element is connected to the common wire.

8. The substrate according to claim 1, wherein
- the first heating element is a film-shaped resistor,
- each of the first temperature detecting element and the second temperature detecting element is a film-shaped resistor, and
- an insulating material is interposed between the first heating element and the first temperature detecting element and the second temperature detecting element.

9. The substrate according to claim 1, wherein
- the first output circuit comprises:
- a first switch element configured to energize the first temperature detecting element by input of a selection signal; and
- a second switch element connected in series with the first switch element and configured to output the temperature information by input of the selection signal,
- wherein the one terminal of the first temperature detecting element is connected to a connection wire between the first switch element and the second switch element.

10. A printing apparatus including a printhead configured to discharge a liquid to a print medium,
- wherein the printhead comprises an element substrate,
- the element substrate comprises
- a first heating element configured to generate thermal energy for discharging the liquid by supply of power,
- a first temperature detecting element configured to detect a temperature of the first heating element,
- a second temperature detecting element configured to detect the temperature of the first heating element,
- a first output circuit configured to energize the first temperature detecting element and output a voltage of one terminal of the first temperature detecting element as temperature information, and
- a second output circuit configured to energize the second temperature detecting element and output a voltage of one terminal of the second temperature detecting element as temperature information, and
- the other terminal of the first temperature detecting element and the other terminal of the second temperature detecting element are connected to a common wire maintained at a predetermined potential.

* * * * *